(12) United States Patent
Oh et al.

(10) Patent No.: US 10,773,964 B2
(45) Date of Patent: Sep. 15, 2020

(54) AEROGEL PRECURSOR, METHOD FOR PREPARING THE SAME, AEROGEL PREPARED THEREWITH, AND METHOD FOR PREPARING AEROGEL USING THE SAME

(71) Applicant: LG CHEM, LTD., Seoul (KR)

(72) Inventors: Kyoung Shil Oh, Daejeon (KR); Hee Jung Choi, Daejeon (KR); Yeong Rae Chang, Daejeon (KR); Je Kyun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/772,681

(22) PCT Filed: Aug. 9, 2017

(86) PCT No.: PCT/KR2017/008650
§ 371 (c)(1),
(2) Date: May 1, 2018

(87) PCT Pub. No.: WO2018/030796
PCT Pub. Date: Feb. 15, 2018

(65) Prior Publication Data
US 2018/0319669 A1 Nov. 8, 2018

(30) Foreign Application Priority Data

Aug. 9, 2016 (KR) .................. 10-2016-0101072
Aug. 9, 2017 (KR) .................. 10-2017-0101114

(51) Int. Cl.
*C01B 33/158* (2006.01)
*C08L 83/04* (2006.01)

(52) U.S. Cl.
CPC .......... *C01B 33/1585* (2013.01); *C08L 83/04* (2013.01)

(58) Field of Classification Search
CPC ...... C07F 7/04; C07F 7/18; C07F 7/28; C07F 7/00; C01B 33/1585
See application file for complete search history.

(56) References Cited

U.S. PATENT DOCUMENTS

| | | | |
|---|---|---|---|
| 5,407,987 A | 4/1995 | Fukushima et al. |
| 6,156,386 A | 12/2000 | Schwertfeger |
| 2016/0096949 A1 | 4/2016 | Evans et al. |
| 2018/0094114 A1 | 4/2018 | Evans et al. |
| 2018/0112057 A1 | 4/2018 | Evans et al. |
| 2018/0112058 A1 | 4/2018 | Evans et al. |
| 2018/0134867 A1 | 5/2018 | Evans et al. |

FOREIGN PATENT DOCUMENTS

| | | |
|---|---|---|
| CN | 1865136 | 11/2006 |
| CN | 101372337 | 2/2009 |
| JP | 2659155 | 9/1997 |
| KR | 20150093062 | 8/2015 |
| WO | 2016-054524 | 4/2016 |

OTHER PUBLICATIONS

Li et al., "Preparation of ambient pressure dried MTMS/TEOS co-precursor silica aerogel by adjusting NH4OH concentration," Materials Letters 129:12-15 (2014).
XP-002787659, Database WPI Week 200929, AN2009-G35908, Thomson Scientific—Summary of Application No. CN20081071895, published as CN101372337 (2017).
Guoyou Wu et al., Preparation and surface modification mechanism of silica aerogels via ambient pressure drying, Materials Chemistry and Physics, 2011, vol. 129, No. 1, pp. 308-314.
Venkateswara Rao et al., Comparative studies of the physical and hydrophobic properties of TEOS based silica aerogels using different co-precursors, Science and Technology of Advanced Materials, 2003, vol. 4, No. 6, pp. 509-515.

*Primary Examiner* — Kuo Liang Peng
(74) *Attorney, Agent, or Firm* — Dentons US LLP (57) ABSTRACT

Provided are an aerogel precursor, a method for preparing the same, an aerogel prepared therewith, and a method for preparing an aerogel using the same, wherein the aerogel precursor includes a structural unit represented by Formula 1 below and at least one selected from the group consisting of structural units represented by Formulae 2 to 4 in a molar ratio of 100:1 to 100:20, and has a weight average molecular weight of 1,000 g/mol to 6,000 g/mol, and a viscosity of 2.0 to 4.0 cps after heating for 24 hours or more at 45 to 60° C.

16 Claims, 2 Drawing Sheets

AEROGEL PRECURSOR, METHOD FOR PREPARING THE SAME, AEROGEL PREPARED THEREWITH, AND METHOD FOR PREPARING AEROGEL USING THE SAME

CROSS-REFERENCE TO RELATED APPLICATIONS

This application is a National Stage Application of International Application No. PCT/KR2017/008650 filed on Aug. 9, 2017, which claims priority to and the benefit of Korean Patent Application No. 10-2016-0101072, filed on Aug. 9, 2016, and Korean Patent Application No. 10-2017-0101114, filed on Aug. 9, 2017, in the Korean Intellectual Property Office, all of which are incorporated herein in their entirety by reference for all purposes as if fully set forth herein.

TECHNICAL FIELD

Technical Field

The present invention relates to an aerogel precursor, a method for preparing the same, an aerogel prepared therewith, and a method for preparing an aerogel using the same, and relates to an aerogel precursor having excellent room temperature and high temperature hydrophobicity and excellent durability, a method for preparing the same, an aerogel prepared therewith, and a method for preparing an aerogel using the same.

Background Art

An aerogel is a material having a porous structure in which $SiO_2$ nanostructures are loosely entangled like nonwoven fabric and air occupies 98% of the total volume. The aerogel has a high porosity, fine, nanoscale level pores, and a high specific surface area and thus exhibits ultra lightweight, super heat-insulating, low dielectric properties. As a result, studies have been actively made of aerogels as insulation materials and environmentally friendly high temperature insulation materials, ultralow dielectric thin films for highly integrated devices, catalysts and catalyst carriers, electrodes for super capacitors, or electrode materials for seawater desalination.

The greatest advantage of the aerogel is super-insulation, wherein the aerogel exhibits a thermal conductivity of 0.300 W/m·K or less, which is lower than that of typical organic insulation materials such as Styrofoam. In addition, the aerogel is used as a high temperature insulation material due to not being susceptible to fire and the generation of harmful gasses that occurs during a fire, which is a critical weakness of the organic insulation materials.

However, in the case of the high temperature material, in addition to low thermal conductivity, durability is also an important factor. Durability requires that heat denaturation due to moisture penetration be prevented.

To achieve this, a surface hydrophobic treatment capable of preventing moisture penetration is essential. Durability may improve as the degree to which the hydrophobic group on the surface of the aerogel is oxidized by heat decreases and the hydrophobic group becomes more stable.

Typically, when synthesizing an aerogel, tetraethoxysilane (TEOS) or hydrolyzed TEOS was used as a precursor, and the porosity of a wet gel was controlled by using water, an alcohol, and an acid or basic catalyst. After hydrophobic surface modification, a hydrophobic aerogel was prepared through supercritical drying and atmospheric pressure drying.

However, when the wet gel, after being prepared, is subjected to hydrophobic surface modification, the wet gel exhibits a lower reaction efficiency than when in a liquid state consisting of a single phase, due to being a two-phase liquid/solid material. Therefore, a large amount of a surface hydrophobizing agent is used in the surface hydrophobizing treatment of the wet gel, and as a result, there is a problem in that the residual surface hydrophobizing agent causes the wet gel to be easily oxidized by heat, thus reducing high temperature durability.

DISCLOSURE OF THE INVENTION

Technical Problem

An aspect of the present invention provides an aerogel precursor which is excellent not only in terms of room temperature and high temperature hydrophobicity, but also durability.

Another aspect of the present invention provides an aerogel precursor which is excellent in terms of all of room temperature and high temperature hydrophobicity, high temperature stability, and thermal insulation.

Another aspect of the present invention provides an aerogel blanket which is excellent in terms of all of room temperature and high temperature hydrophobicity, high temperature stability and thermal insulation.

According to an aspect of the present invention, there is provided a method for preparing an aerogel, which does not require a solvent replacement process.

Technical Solution

The present invention provides an aerogel precursor characterized by comprising a structural unit represented by Formula 1 below and at least one selected from the group consisting of structural units represented by Formulae 2 to 4 below in a molar ratio of 100:1 to 100:20, wherein the aerogel precursor has a weight average molecular weight of 1,000 to 6,000 g/mol, and a viscosity of 2.0 to 4.0 cps after being heated for 24 hours at 45 to 60° C.

-continued

<Formula 3>

<Formula 4>

In Formulae 1 to 4, $L_1$ to $L_4$ are the same as or different from each other and are each independently a direct bond or O, X is Si, Ti, Zr, Hf or Rf, $R_1$ is a substituted or unsubstituted $C_1$ to $C_{20}$ linear alkyl group, a substituted or unsubstituted $C_3$ to $C_{20}$ branched or cyclic alkyl group, a substituted or unsubstituted $C_2$ to $C_{20}$ linear alkenyl group, a substituted or unsubstituted $C_4$ to $C_{20}$ branched alkenyl group, a substituted or unsubstituted $C_2$ to $C_{20}$ linear alkynyl group, or a substituted or unsubstituted $C_5$ to $C_{20}$ aryl group, and $R_2$ is a halogen atom, a hydroxyl group, a substituted or unsubstituted $C_1$ to $C_{20}$ alkoxy group, a substituted or unsubstituted $C_1$ to $C_{20}$ alkyloyl group, or a substituted or unsubstituted $C_1$ to $C_{20}$ alkyloxy group.

The present invention provides a method for preparing the aerogel precursor, the method characterized by comprising a first step of preparing a mixture by mixing a compound represented by Formula 21 below and a compound represented by Formula 22 below in a molar ratio of 100:1 to 100:20 with alcohol; and a second step of hydrolyzing and polycondensing the mixture.

<Formula 21>

<Formula 22>

In Formulae 21 and 22, R is a substituted or unsubstituted $C_1$ to $C_{20}$ linear alkyl group, or a substituted or unsubstituted $C_3$ to $C_{20}$ branched or cyclic alkyl group, X is Si, Ti, Zr, Hf, or Rf, $R_1$ is a substituted or unsubstituted $C_1$ to $C_{20}$ linear alkyl group, a substituted or unsubstituted $C_3$ to $C_{20}$ branched or cyclic alkyl group, a substituted or unsubstituted $C_2$ to $C_{20}$ linear alkenyl group, a substituted or unsubstituted $C_4$ to $C_{20}$ branched alkenyl group, a substituted or unsubstituted $C_2$ to $C_{20}$ linear alkynyl group, or a substituted or unsubstituted $C_5$ to $C_{20}$ aryl group, and $R_2$ is a halogen atom, a hydroxyl group, a substituted or unsubstituted $C_1$ or $C_{20}$ alkoxy group, a substituted or unsubstituted $C_1$ or $C_{20}$ alkyloyl group, or a substituted or unsubstituted $C_1$ or $C_{20}$ alkyloxy group.

The present invention provides a method for preparing an aerogel, the method characterized by comprising: mixing the aerogel precursor with a basic catalyst to form a wet gel at pH≥3; mixing the wet gel with a hydrophobic agent to modify a surface; and drying the surface-modified gel.

Advantageous Effects

An aerogel precursor according an embodiment to the present disclosure has excellent room temperature and high temperature hydrophobicity, as well as excellent durability, and may to be used while being stored for a long time after being mass produced. In addition, since the aerogel precursor of the present disclosure even imparts hydrophobicity to a wet gel formed during the preparation of the aerogel, the compatibility of the wet gel and the organic solvent may be improved, thereby increasing efficiency during the surface modification and reducing the amount of the surface modification agent used.

The aerogel and the aerogel blanket of the present disclosure may be excellent in terms of room temperature and high temperature hydrophobicity, high temperature stability, and thermal insulation.

MODE FOR CARRYING OUT THE INVENTION

Hereinafter the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

In the present specification, the term "substituted or unsubstituted" means to be substituted or unsubstituted with at least one substituent selected from the group consisting of a deuterium atom; a cyano group; a $C_1$ to $C_{20}$ linear alkyl group; a $C_3$ to $C_{20}$ branched alkyl group; a $C_2$ to $C_{20}$ linear alkenyl group; a $C_4$ to $C_{20}$ branched alkenyl group; a $C_2$ to $C_{20}$ linear alkynyl group; a $C_3$ to $C_{20}$ cycloalkyl group and a $C_6$ to $C_{20}$ aryl group.

In the formulae described in the present disclosure, represents a site bonded to another substituent or structural unit.

1. Aerogel Precursor

An aerogel precursor according to an embodiment of the present disclosure includes a structural unit represented by Formula 1 below and at least one selected from the group consisting of structural units represented by Formulae 2 to 4 in a molar ratio of 100:1 to 100:20, has a weight average molecular weight of 1,000 to 6,000 g/mol, and has a viscosity of 2.0 to 4.0 cps after heating for 24 hours at 45 to 60° C.

<Formula 1>

<Formula 2>

<Formula 3>

<Formula 4>

In Formulae 1 to 4, $L_1$ to $L_4$ are the same as or different from each other, and are each independently a direct bond or O, and X may be Si, Ti, Zr, Hf or Rf, more specifically Si.

$R_1$ is a hydrophobic function group imparting hydrophobicity to the aerogel precursor, which is a substituted or unsubstituted $C_1$ to $C_{20}$ linear alkyl group, a substituted or unsubstituted $C_3$ to $C_{20}$ branched or cyclic alkyl group, a substituted or unsubstituted $C_2$ to $C_{20}$ linear alkenyl group, a substituted or unsubstituted $C_4$ to $C_{20}$ branched alkenyl group, a substituted or unsubstituted $C_2$ to $C_{20}$ linear alkynyl group, or a substituted or unsubstituted $C_5$ to $C_{20}$ aryl group, and specifically, may be a substituted or unsubstituted $C_1$ to $C_{20}$ linear alkyl group, a substituted or unsubstituted $C_3$ to $C_{20}$ branched alkyl group, or a substituted or unsubstituted $C_5$ to $C_{20}$ aryl group.

The alkyl group may be a substituted or unsubstituted $C_1$ to $C_{10}$ linear alkyl group or a substituted or unsubstituted branched $C_3$ to $C_{10}$ branched alkyl group, and specific examples thereof include a methyl group, an ethyl group, a propyl group, a butyl group, a pentyl group, a hexyl group, a heptyl group, a octyl group, a nonyl, a decyl group, isopropyl, isobutyl, sec-butyl and tert-butyl, isopentyl, neopentyl, isohexyl, isoheptyl, isooctyl, isononyl, isodecyl, or the like.

The cyclic alkyl group may include a $C_3$ to $C_{20}$ monocyclic or polycyclic ring, and polycyclic ring may indicate a group directly bonded to another ring group or condensed therewith. Here, the other ring group may be a cycloalkyl group, a heterocycloalkyl group, an aryl group or a heteroaryl group. The cycloalkyl group may be a substituted or unsubstituted $C_3$ to $C_{10}$ cycloalkyl group, and specific examples thereof include a cyclopropyl group, a cyclobutyl group, a cyclopentyl group, a cyclohexyl group, a cycloheptyl group, a cyclooctyl group, a cyclononyl group, a cyclodecyl group, or the like.

The alkenyl group may be a substituted or unsubstituted $C_2$ to $C_{10}$ linear alkenyl group or a substituted or unsubstituted $C_4$ to $C_{10}$ branched alkenyl group, and specific examples thereof include an ethenyl group, a propenyl group, a butenyl group, a pentenyl group, a hexenyl group, a heptenyl group, an octenyl group, a nonenyl group, a decenyl group, or the like.

The alkynyl group may be a substituted or unsubstituted $C_2$ to $C_{10}$ linear alkynyl group, and specific examples thereof include an ethynyl group, a propynyl group, a butynyl group, a pentynyl group, a hexynyl group, a heptynyl group, an octynyl group, a nonynil group, a decyl group, or the like.

The aryl group includes a monocyclic or polycyclic ring, and polycyclic ring indicates a group directly bonded to another ring group or condensed therewith. Specific examples of the aryl group include a phenyl group, a biphenyl group, a triphenyl group, a naphthyl group, an anthryl group, a phenanthrenyl group, a pyrenyl group, a fluorenyl group, or the like.

The $R_1$ may be specifically a substituted or unsubstituted $C_1$ to $C_{20}$ linear alkyl group, or a substituted or unsubstituted $C_3$ to $C_{20}$ branched group, and more specifically, may be a methyl group.

Each $R_2$ is independently the same or different, and is a halogen atom, a hydroxyl group, a substituted or unsubstituted $C_1$ to $C_{20}$ alkoxy group, a substituted or unsubstituted $C_1$ to $C_{20}$ alkyloyl group, a substituted or unsubstituted $C_1$ to $C_{20}$ alkyloxy group, and specifically, may be a halogen atom, a hydroxyl group, an unsubstituted $C_1$ to $C_{20}$ alkoxy group.

The halogen atom may be one selected from the group consisting of F, Cl, Br, I and At, and specifically, may be one selected from the group consisting of F, Cl, Br and I.

The alkoxy group may be a $C_1$ to $C_{10}$ alkoxy group, and specific examples thereof include a methoxy group, an ethoxy group, a propoxy group, a butoxy group, a pentoxy group, a hexoxy group, an octoxy group, a nonoxy group, a dodecyloxy, or the like.

Specific examples of the alkyloxy group include an acetyl group, a propionyl group, an n-butyryloxy group, a stearoxy group, or the like.

Specific examples of the alkyloyloxy group include a propionyloxy group, an n-butyryloxy group, and a stearoyloxy group.

The $R_2$ may specifically be an unsubstituted $C_1$ to $C_{20}$ alkoxy group, and more specifically, may be a methoxy group.

The aerogel precursor may include the structural unit represented by Formula 1 and at least one selected from the group consisting of structural units represented by Formulae 2 to 4, preferably in a molar ratio of 100:1 to 100:15, more preferably in a molar ratio of 100:4 to 100:10, and may have a weight average molecular weight of preferably 1,000 to 5,500 g/mol, more preferably 1,000 to 3,500 g/mol.

When the molar ratio and weight average molecular weight of the structural units are satisfied, the aerogel precursor may by itself have excellent hydrophobicity. Also, the aerogel precursor has excellent durability and is thus mass producible, and may be used in an aerogel preparing process while being stored for a long time after being mass produced. Further, the aerogel precursor may impart hydrophobicity to the wet gel generated during the preparation of the aerogel or aerogel blanket. Furthermore, the wet gel imparted with hydrophobicity may exhibit improved compatibility with an organic solvent, and as a result, the efficiency of the surface modification process during the preparation of the aerogel or aerogel blanket may be increased, and the amount of the surface modification agent used may be reduced. The aerogel or aerogel blanket made from the aerogel precursor of the present disclosure is excellent not only in terms of room temperature and high temperature hydrophobicity, but also in terms of high temperature thermal stability and thermal insulation.

The aerogel precursor has a viscosity of 2.0 to 4.0 cps, preferably 2.5 to 3.5 cps, and more preferably 2.8 to 2.9 cps after being heated for 24 hours at 45 to 60° C. The aerogel precursor may maintain the above-described viscosity range not only after being heated, but also prior to and while being heated.

Typically, leaving the aerogel precursor for 1 hour at 45 to 60° C. means leaving the aerogel precursor for 1 hour at room temperature (23±3° C.). The fact that the aerogel precursor satisfies all of the above-described viscosity conditions indicates that the aerogel precursor maintains a viscosity of 2.0 to 4.0 cps, preferably 2.5 to 3.5 cps, more preferably 2.8 to 2.9 cps for 6 months or more at room temperature, and has excellent durability.

Meanwhile, the Si of the structural unit represented by Formula 1 in the aerogel precursor may be bonded to the Si of the structural unit represented by Formula 1 via O (oxygen). Specifically, the aerogel precursor may include a structural unit represented by Formula 5 below.

<Formula 5>

$L_1$ to $L_4$ are defined as shown in Formula 1.

The Si of the structural unit represented by Formula and the X of at least one selected from the group consisting of the structural units represented by Formulae 2 to 4 1 may be bonded to each other via O (oxygen). Specifically, the aerogel precursor may include at least one selected from the group consisting of structural units represented by Formulae 6 to 8 below.

<Formula 6>

<Formula 7>

<Formula 8>

$X$, $L_1$, $L_3$, $L_4$, $R_1$ and $R_2$ are defined as shown in Formulae 1 to 4.

The structural unit represented by Formula 6 may include at least one selected from the group consisting of structural units represented by Formulae 6-1 to 6-3 below.

<Formula 6-1>

<Formula 6-2>

<Formula 6-3>

The structural unit represented by Formula 7 may include at least one selected from the group consisting of structural units represented by Formulae 7-1 to 7-3 below.

<Formula 7-1>

<Formula 7-2>

<Formula 7-3>

The structural unit represented by Formula 8 may include at least one selected from the group consisting of structural units represented by Formulae 8-1 to 8-3 below.

<Formula 8-1>

<Formula 8-2>

<Formula 8-3>

In Formulae 6-1 to 6-3, 7-1 to 7-3, and 8-1 to 8-3, R may be a substituted or unsubstituted $C_1$ to $C_3$ linear alkyl group, or a substituted or unsubstituted $C_3$ to $C_{20}$ branched or cyclic alkyl group, specifically a substituted or unsubstituted $C_1$ to $C_3$ linear alkyl group, more specifically an ethyl group.

X, $R_1$ and $R_2$ are defined as shown in Formulae 2 to 4.

Meanwhile, the aerogel precursor may include at least two selected from the group consisting of structural units represented by Formulae 2 to 4. When the aerogel includes at least two of the structural units, the high temperature hydrophobic thermal stability of the aerogel, which is a final product, may be further improved. When two or more of the structural units are included, two or more of the same structural unit may be included or two or more different structural units may be included. When two or more of the same structural unit is included, the Xs of the structural units represented by Formulae 2 to 4 may be bonded to each other via O. Specifically, the Xs are may be represented by at least one selected from the group consisting of the structural units represented by Formulae 9 and 10.

<Formula 9>

<Formula 10>

In Formulae 9 and 10, X, $R_1$ and $R_2$ are defined as shown in Formulae 2 to 4.

When two or more different structural units are included, the Xs of the structural units represented by Formulae 2 to 4 may be bonded to each other via O. Specifically, the Xs may be represented by at least one selected from the group consisting of the structural units represented by Formulae 11 to 13 below.

<Formula 11>

<Formula 12>

<Formula 13>

In Formulae 11 to 13, X, $R_1$ and $R_2$ are defined as shown in Formulae 2 to 4.

In the aerogel precursor, the Si of the structural unit represented by Formula 1 and the X of at least one selected from the structural units represented by Formulae 9 to 13 may be bonded to each other via O. Specifically, the aerogel precursor may include the structural unit represented by Formula 1; and at least one selected from the group consisting of the structural units represented by Formulae 14 to 18.

<Formula 14>

<Formula 15>

<Formula 16>

<Formula 17>

<Formula 18>

In Formulae 14 to 18, X, $R_1$ and $R_2$ are defined as shown in Formulae 2 to 4.

The structural unit represented by Formula 14 may include at least one selected from the group consisting of structural units represented by Formulae 14-1 to 14-3 below.

<Formula 14-1>

<Formula 14-2>

<Formula 14-3>

The structural unit represented by Formula 15 may include at least one selected from the group consisting of structural units represented by Formulae 15-1 to 15-3 below.

<Formula 15-1>

<Formula 15-2>

<Formula 15-3>

The structural unit represented by Formula 16 may include at least one selected from the group consisting of structural units represented by Formulae 16-1 to 16-3 below.

<Formula 16-1>

<Formula 16-2>

<Formula 16-3>

The structural unit represented by Formula 17 may include at least one selected from the group consisting of structural units represented by Formulae 17-1 to 17-3 below.

<Formula 17-1>

<Formula 17-2>

<Formula 17-3>

The structural unit represented by Formula 18 may include at least one selected from the group consisting of structural units represented by Formulae 18-1 to 18-3 below.

<Formula 18-1>

<Formula 18-2>

<Formula 18-3>

In Formulae 14-1 to 14-3, 15-1 to 15-3, 16-1 to 16-3, 17-1 to 17-3, and 18-1 to 18-3, R may be a substituted or unsubstituted $C_1$ to $C_3$ linear alkyl group, or a substituted or unsubstituted $C_3$ to $C_{20}$ branched or cyclic alkyl group, specifically a substituted or unsubstituted $C_1$ to $C_3$ linear alkyl group, more specifically an ethyl group.

X, $R_1$ and $R_2$ are defined as shown in Formulae 2 to 4.

Meanwhile, the structural unit represented by Formula 1 may be derived from a compound represented by Formula 21 below, and the structural unit represented by Formulae 2 to 4 may be derived from a compound represented by Formula 22 below.

<Formula 21>

<Formula 22>

In Formulae 21 and 22, R, X, $R_1$ and $R_2$ are defined as described in the description of Formula 6-1.

Specifically, R may be an ethyl group, X may be Si, $R_1$ may be a methyl group, and $R_2$ may be methoxy.

The degree of hydrolysis of the aerogel precursor according to an embodiment of the present invention may be 60% to 95%. When the above-described range is satisfied, the wet gel formed using the aerogel precursor may be obtained within a short period of time. When the degree of hydrolysis is less than the above-described range, the formation time of the wet gel becomes long, and the transparency and heat resistance of the aerogel may be reduced. When the degree of hydrolysis exceeds the above-described range, the durability of the aerogel precursor prepared therewith may be reduced.

Meanwhile, the aerogel precursor according to an embodiment of the present disclosure may be prepared by a method including: Step 1 of preparing a mixture by mixing a compound represented by Formula 21 below and a compound represented by Formula 22 below in a molar ratio of 100:1 to 100:20, with alcohol; and Step 2 of hydrolyzing and polycondensing the mixture.

<Formula 21>

<Formula 22>

In formulae 21 and 22, R, X, $R_1$ and $R_2$ are defined as described in the description of the aerogel precursor.

In Step 1, the alcohol has compatibility with water, and is not particularly limited as long as the alcohol can dissolve the compound represented by Formulae 21 and 22. The alcohol may be at least one selected from the group consisting of methanol, ethanol, propanol, isopropanol, and butanol.

The alcohol may be included in an amount of 1 to 40 parts by weight, based on 100 parts by weight of the total amount of the compounds represented by Formulae 21 and 22. When the above-described range is satisfied, the silica content inside the aerogel precursor may be appropriately controlled.

Step 2 may include Step 2-1 of forming a reactant by hydrolyzing the mixture using an acid catalyst and water, and Step 2-2 of preparing the aerogel precursor by polycondensing the reactant.

In Step 2-1, the acid catalyst may be at least one selected from the group consisting of hydrochloric acid, nitric acid, acetic acid, citric acid, and oxalic acid. The acid catalyst may be included in an amount of 0.01 to 0.1 parts by weight, based on 100 parts by weight of the total amount of the compounds represented by Formulae 21 and 22.

The water may be included in an amount of 0.1 to 20 parts by weight, based on 100 parts by weight of the total amount of the compounds represented by Formulae 21 and 22, and when the above-described content is satisfied, by controlling the degree of hydrolysis, the aerogel precursor satisfying the above-described weight average molecular weight and viscosity conditions may be prepared.

Here, the water and the acid catalyst may be in the form of an acid catalyst aqueous solution. The acid catalyst aqueous solution may be included in the mixture by being added dropwise, one drop at a time.

When Step 2-1 is completed, the reactant color may be murky and the temperature thereof may be higher than room temperature, but Step 2-2 may be performed after leaving the reactant alone until the color becomes clear and the temperature goes down to room temperature.

Step 2-2 may be a step in which the reactant is heat-refluxed at 70 to 100° C. for 1 hour to 30 hours, cooled down to room temperature, and filtered under reduced pressure using a filter to prepare an aerogel precursor. When the temperature and time conditions described above are satisfied, an aerogel precursor satisfying the weight average molecular weight and viscosity conditions described above may be prepared.

2. Aerogel

An aerogel according to another embodiment of the present disclosure may be prepared by using the aerogel precursor according to an embodiment of the present disclosure.

In an aerogel according to another embodiment of the present disclosure, even all of the small pores in the aerogel precursor become hydrophobic, and thus excellent hydrophobicity may be exhibited at room temperature and high temperatures. Furthermore, the aerogel may have high porosity, low thermal conductivity, and excellent mechanical flexibility.

In addition, the aerogel may have a carbon content of 10 to 15% by weight with respect to the total weight of the aerogel at room temperature, and may have a carbon content of 1 to 4% by weight with respect to the total weight of aerogel at high temperatures. In other words, not only is room temperature hydrophobicity excellent due to the high carbon content in the aerogel, but high temperature hydrophobicity may also be excellent because more carbon may remain than in the case of typical aerogels at high temperatures.

In addition, the aerogel may have a specific surface area of 500 $m^2/g$ to 800 $m^2/g$.

In addition, the aerogel is a particulate porous structure including a plurality of micropores. Primary particles made of nano-sized particles, specifically, primary particles having an average particle diameter ($D_{50}$) of 100 nm or less may bond with each other to form a microstructure having a network-like cluster, that is, a three-dimensional mesh structure.

In the present disclosure, the carbon content may be measured by using an Eltra Carbon/Sulfur Analyzer (CS-800). Also, the specific surface area may be measured as the amount of nitrogen adsorption/desorption according to partial pressure (0.11<p/p0<1), by using a Micrometrics ASAP 2020 instrument.

Meanwhile, an aerogel according to another embodiment of the present disclosure may be prepared by a method including the steps of: adding a base to silica sol including an aerogel precursor according to an embodiment of the present disclosure to prepare a wet gel; aging the wet gel; surface-modifying the aged wet gel; and subjecting the wet gel to supercritical drying.

The silica sol may be prepared by further adding water and alcohol to an aerogel precursor. The alcohol is as described in the description of the aerogel precursor.

Examples of the base include an inorganic base such as sodium hydroxide and potassium hydroxide; and an organic base such as ammonium hydroxide. In the case of the inorganic base, metal ions contained in the compound may be coordinated to a Si—OH compound, and thus the organic base may be preferable. Specifically, examples of the organic base may include ammonium hydroxide ($NH_4OH$), tetramethylammonium hydroxide (TMAH), tetraethylammonium hydroxide (TEAH), tetrapropylammonium hydroxide (TPAH), tetrabutylammonium hydroxide (TBAH), methylamine, ethylamine, isopropylamine, monoisopropylamine, diethylamine, diisopropylamine, dibutylamine, trimethylamine, triethylamine, triisopropylamine, tributylamine, colin, monoethanolamine, diethanolamine, 2-aminoethanol, 2-(ethylamino)ethanol, 2-(methylamino) ethanol, N-methyldiethanolamine, dimethylaminoethanol, diethylaminoethanol, nitrilotriethanol, 2-(2-aminoethoxy) ethanol, 1-amino-2-propanol, triethanolamine, monopropanolamine, dibutanolamine, or the like. Any one or a mixture of two or more thereof may be used. More specifically, the base may be ammonium hydroxide ($NH_4OH$).

Since the base may precipitate when introduced as a solid phase, it may be preferable to add the base in the form of a solution diluted by the polar organic solvent.

The aging step is a step for leaving the wetting gel at an appropriate temperature in order to allow the chemical change to be completed. The aging process for the wetting gel may strengthen the mesh structure inside the wetting gel. In addition, during the aging process, the water inside the wet gel may be replaced with the polar organic solvent, and as a result, it is possible in the subsequent supercritical drying process, to prevent pore structure deformation and reduction of the silica gel caused by moisture evaporation inside the wet gel.

The aging step may be performed until the chemical change is completed in the wet gel, and specifically, may be performed by immersing the wet gel-based composite in the aging solution at 50 to 80° C. for 1 hour to 6 hours, more specifically, at 60 to 75° C. for 2 hours to 4 hours.

The aging solution may be alcohol, and the alcohol is as described above.

The surface-modifying step may be carried out at 40 to 80° C. for 1 hour to 6 hours after immersing the wet gel in the surface modification solution. Specifically, the surface modification solution may be a solution including alcohol and at least one selected from the group consisting of hexamethyldisilazane, tetramethylchlorosilane, silicone oil, aminosilane, alkylsilane, polydimethylsiloxane, dimethyldichlorosilane, and the like. The alcohol is as described above.

Performing the surface-modifying step causes the pores of the wet gel to become hydrophobic, and thus water in the pores may be easily removed during supercritical drying.

The supercritical drying step may be a supercritical drying step using supercritical carbon dioxide. Carbon dioxide ($CO_2$) is in a gaseous state at room temperature and atmospheric pressure, but when the limit of a certain temperature and high pressure called a supercritical point is exceeded, $CO_2$ does not evaporate and becomes a critical state in which gas and liquid are indistinguishable. Carbon dioxide in this critical state is called supercritical carbon dioxide. Supercritical carbon dioxide has a molecular density similar to that of liquids, but has a low viscosity similar to that of gasses. Also, supercritical carbon dioxide has a rapid diffusion rate and a high thermal conductivity, and thus has a high drying efficiency and can shorten the time consumed by a drying process.

In the supercritical drying step, a surface-modified wet gel is put into a supercritical drying reactor, and a solvent replacement process may then be performed by filling with liquid state $CO_2$ and replacing the solvent in the silica gel with $CO_2$. Thereafter, the temperature is elevated to 30 to 80° C., preferably 40 to 70° C., at a predetermined heating rate, specifically a rate of 0.1 to 1/min, and by maintaining a pressure equal to or higher than the pressure at which carbon dioxide becomes a supercritical state, that is, a pressure of 75 to 300 bar, preferably 80 to 200 bar, more preferably 100 to 150 bar, and carbon dioxide may be maintained in a supercritical state for a prescribed amount of time, specifically 20 minutes to 1 hour. Typically, carbon dioxide becomes supercritical at a temperature of 31° C. and a pressure of 73.8 bar. The supercritical drying step may be completed by maintaining carbon dioxide for 2 hours to 12 hours, specifically, 2 hours to 6 hours, at a prescribed temperature and pressure at which carbon dioxide is in a supercritical state, and then gradually removing the pressure.

An aerogel according to anther embodiment of the present disclosure may also be prepared by a method including the steps of mixing an aerogel precursor with a basic catalyst according to an embodiment of the present disclosure to form a wet gel at pH 3; mixing the wet gel with a hydrophobic agent to modify the surface; and drying the surface-modified wet gel.

The step of forming the wet gel is as described in the above-described method for preparing an aerogel.

The step of mixing the wet gel with the hydrophobic agent to modify the surface may be a step of silylating the surface of the wet gel using a silylating agent which is a hydrophobic agent.

In addition, the silylation may cause some of the water in the pores of the wet gel to react with the used silylating agent, thereby forming a non-water-soluble compound, and the water present in the pores may be automatically replaced in an amount equal to the molar volume of the compound formed. Also, during the silylation of the wet gel, the water in the pores of the wet gel and the water phase formed by water may be easily separated from the wet gel by the non-water-soluble compound. Due to such silylation, a separate solvent replacement process may not be required.

The silylating agent may be preferably at least one selected from the group consisting of $(R_3)_{4-n}SiCl_n$, $(R_4)_{4-m}Si(OR_5)_m$, $(R_6)_3Si$—O—$Si(R_6)_3$, and $(R_7)_3Si$—O—$Si(R_7)_3$, Wherein $R_3$ to $R_7$ are the same as or different from each other, and may be each independently a hydrogen atom, a substituted or unsubstituted $C_1$ to $C_{20}$ linear alkyl group, a substituted or unsubstituted $C_3$ to $C_{20}$ branched or cyclic alkyl group, a substituted or unsubstituted $C_5$ to $C_{20}$ aryl group, and n and m may be the same as or different from each other and may be each independently 1 to 4.

The silylating agent may be more preferably at least one selected from the group consisting of silazane, hexamethyldisilazane, trimethylchlorosilane, hexamethyldisiloxane, trimethylsiloxane, and isopropoxytrimethylsilane.

The silylating agent may be used in a liquid state or a gaseous state. The liquid state may be either the silylating agent by itself or the silylating agent dissolved in alcohol.

In the step of drying the surface-modified wet gel, the temperature may be −30 to 200° C., preferably 0 to 150° C., and the pressure may be 0.001 to 20 bars, preferably 0.01 to 5 bars, more preferably 0.1 to 2 bars. The surface-modified wet gel may be dried by radiation, convection and contact drying.

In an aerogel prepared by a method for preparing the aerogel, the degree of covering of an inner surface by organic surface groups as a result of the surface silylation may be at least 90% of the theoretically possible value.

In the present disclosure, degree of covering indicates the number of organic surface groups per square nanometer of the inner surface area of the aerogel. With surface modification of a porous $SiO_2$ material by trimethylchlorosilane, a maximum degree of covering of a trimethylsilyl group (TMS) of 2.8 nm$^{-2}$ may be theoretically obtained. The degree of covering of the TMS may be calculated from the steric bulk of a TMS unit. This is described as the umbrella effect in the literature. The required space is calculated from the Si—C(0.189 nm) and C—H (0.108 nm) bond length and the Van der Waals radius of the TMS molecule to be about 0.36 nm$^2$ per TMS molecule. When converted, this corresponds to the degree of covering of the TMS per nm$^2$ (W. Urbaniak, F. Janowski, B. Marciniec, F. Wolf, React. Kinet. Catal, Lett, 1987, 34, 129; K. K. Unger, Journal of Chromatography Library 1979, 16, 64; E. V. Broun, A. Ya. Korolev, L. M. Vinogradova, R. V. Artamonova, T. V. Men'kova, Russ. J. Phys. Chem. 1970, 44, 442).

The degree of covering may be calculated by using the following equation.

The degree of covering=$([C]/[BET] \times K$; unit: [nm$^{-2}$]

$K=6.022 \times 10^{23}/100 \times 12 \times 3 \times 10^{18}=167.28$; unit: [g$^{-1}$]
[C]: C content in weight %
[BET]: BET surface area; unit: [m$^2$/g]

3. Aerogel Blanket

An aerogel blanket according to another embodiment of the present disclosure may be prepared by using the aerogel precursor according to an embodiment of the present disclosure.

The aerogel blanket according to another embodiment of the present disclosure is also hydrophobized up to even all the small pores in the aerogel precursor, and thus may have excellent hydrophobicity at room temperature and high temperatures. In addition, the aerogel contained in the aerogel blanket may also have high porosity, low thermal conductivity, and excellent mechanical strength.

The aerogel blanket according to another embodiment of the present disclosure may be an aerogel blanket which is excellent in terms of thermal insulation, with a thermal conductivity of 20 mW/mK or less.

In the present disclosure, thermal conductivity may be measured by using HFM436 Lambda equipment of NETZSCH Inc.

Meanwhile, the aerogel blanket according to another embodiment of the present disclosure may be prepared by a method including the steps of immersing a base material for a blanket into silica sol including an aerogel precursor according to an embodiment of the present disclosure, and then adding a base to prepare a wet gel-based composite; aging the wet gel-based composite; surface-modifying the aged wet gel-based composite; and subjecting the wet gel-based composite to the supercritical drying.

The base material for a blanket may be a film, a sheet, a net, a fiber, a porous body, a foam, a nonwoven fabric, or a laminate of two layers or more thereof, and the surface thereof may be roughened or patterned depending on the usage. More specifically, the base material for a blanket may be a fiber capable of further improving thermal insulation by including spaces or voids in which the aerogel may be easily inserted into the base material for a blanket.

Also, the base material for a blanket preferably has a low thermal conductivity.

Specifically, the base material for a blanket may include, but is not limited to, polyamide, polybenzimidazole, polyaramid, acrylic resin, phenol resin, polyester, polyetheretherketone (PEEK), polyolefin (for example, polyethylene, polypropylene, copolymers thereof, or the like), cellulose, carbon, cotton, wool, hemp, nonwoven fabric, glass fiber, ceramic wool, or the like. More specifically, the base material may include glass fiber or polyethylene.

Meanwhile, the aerogel blanket may be prepared by a method which is identical to the method for preparing an aerogel other than that the step in the method for preparing an aerogel blanket, of immersing the base material for a blanket in silica sol including the aerogel precursor is performed.

EXAMPLE

Hereinafter, the present disclosure will be described in more detail with reference to the following examples and experimental examples. However, the following examples and experimental examples are merely provided for illustrating the present disclosure, and the scope of the present disclosure is not limited by these examples and experimental examples.

<Preparation of Aerogel Precursor>

Synthesis Example 1 to Synthesis Example 4 and Comparative Synthesis Example 1

Tetraethoxysilane (TEOS), methyltrimethoxysilane (MTMS) and ethanol (C$_2$H$_5$OH) (industrial use, 94 to 96% by volume) were charged into the reactor at room temperature (23±3° C.) in the contents shown in Table 1 below. Then, while stirring at a rate of 130 rpm, the hydrochloride acid solution of pH 1.0 was continuously added dropwise for 1 hour to prepare the first reaction product. The reaction was terminated after refluxing the first reactant at 80° C. for 20 hours, and a second reactant was prepared by cooling the first reactant to room temperature. The second reactant was filtered under reduced pressure using a filter to prepare the aerogel precursors having the molar ratios of TEOS-derived structural units and MTMS-derived structural units, and weight average molecular weights shown in Table 1.

TABLE 1

| Classification | TEOS | MTMS | Molar ratio of TEOS-derived structural units and MTMS-derived structural units | Weight average molecular weight (g/mol) |
|---|---|---|---|---|
| Synthesis Example 1 | 100 mol | 4 mol | 20:1 | about 2,250 |
| Synthesis Example 2 | 100 mol | 6 mol | 50:3 | about 5,200 |
| Synthesis Example 3 | 100 mol | 8 mol | 25:4 | about 3,030 |
| Synthesis Example 4 | 100 mol | 10 mol | 10:1 | about 1,300 |
| Comparative Synthesis Example 1 | 100 mol | — | 10:0 | about 1,150 |

Comparative Synthesis Example 2

TEOS, ethanol, and oxalic acid aqueous solution (oxalic acid: 0.001M) were mixed in a molar ratio of 1:5:7 at room temperature to prepare silica alcosol. The MTMS was added to the silica alcosol in a molar ratio of 0.1 (TEOS:MTMS=100:10) relative to TEOS while stirring to prepare an aerogel precursor. However, natural gelation occurred immediately after the aerogel precursor was prepared, and thus weight average molecular weight could not be measured.

Experimental Example 1: Evaluation of Characteristics of Aerogel Precursor

Since leaving the aerogel precursor for 1 hour at 50° C. can achieve the same effect as leaving the aerogel precursor for one week at room temperature, the change in viscosity over time was measured while heating the aerogel precursor of Synthesis Example 4 in a 50° C. oven for 24 hours. The results are shown in FIG. 1.

1) Viscosity Measurement Method: Viscometer TV-22 (Disk Type, TOKISANGYO Co. LTD) was used to measure the viscosity at 100 rpm and 20° C.

Figure 1:
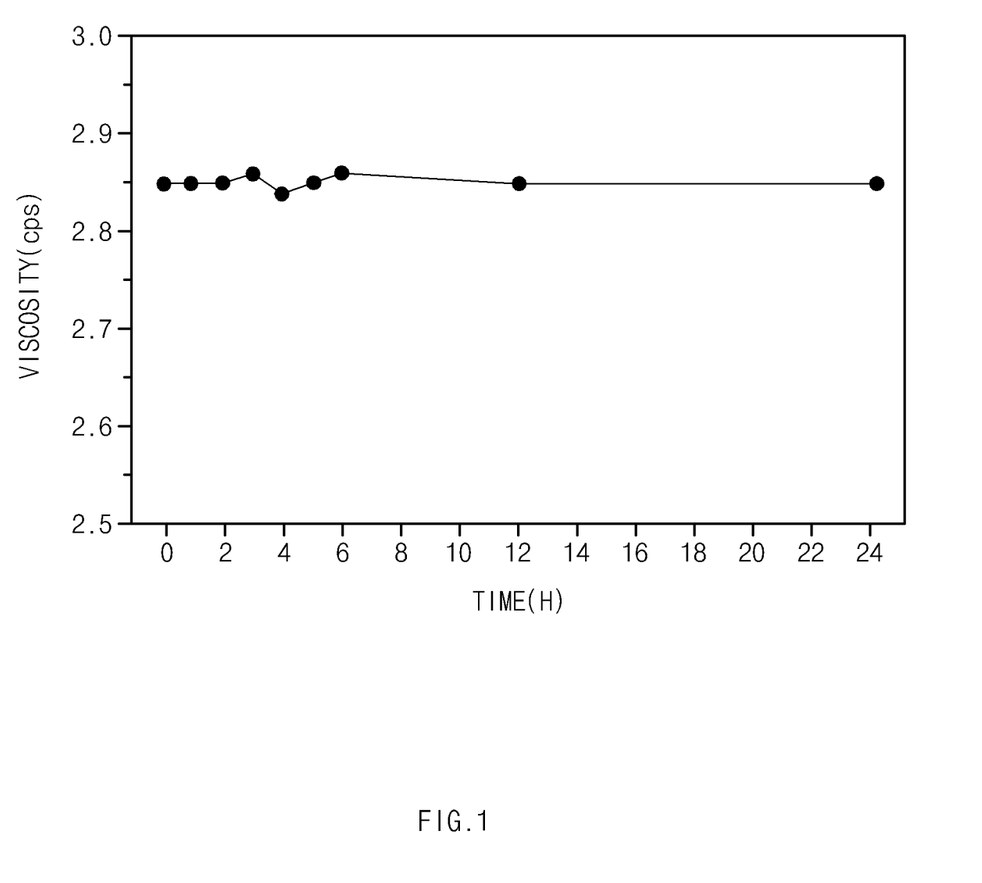
FIG. 1 is a graph measuring the change in viscosity at 50° C. over time of an aerogel precursor in Synthesis Example 4.

As shown in FIG. 1, it was observed that the aerogel precursor of Synthesis Example 4 maintained a relatively constant viscosity even after being heated for 24 hours at 50° C. From these results, it may be deduced that the aerogel precursor of Synthesis Example 4 according to an embodiment of the present disclosure can maintain a constant viscosity even after 6 months at room temperature after preparation, and has excellent durability.

<Preparation of Aerogel>

Example 1 to Example 4 and Comparative Example 1

In Synthesis Examples 1 to 4 and Comparative Synthesis Example 1 described in Table 2 below, an aerogel precursor solution was prepared by mixing the aerogel precursor, ethanol and water in a weight ratio of 1:0.5:0.3. At room temperature, the catalyst ($NH_4OH:C_2H_5OH$=volume ratio of 1:12.65) was mixed with the aerogel precursor solution in a weight ratio of 1:0.12, and was gelled to form a wet gel. The wet gel was aged for 1 hour at 60° C. The aged wet gel was surface-modified for 4 hours at 60° C. with the surface modification solution, which was a mixture of ethanol and hexamethyldisilasane (HMDS) (volume ratio of ethanol:HMDS=95:5). The surface-modified wet gel was subjected to supercritical drying using $CO_2$ at 50° C. and 100 bars for 8 hours, and was dried for 1 hour at 150° C. and atmospheric pressure to prepare an aerogel.

Example 5

The aerogel was prepared in the same manner as in Example 4, except that surface modification was not performed.

TABLE 2

| Classification | Aerogel Precursor | Surface modification |
|---|---|---|
| Example 1 | Synthesis Example 1 | ○ |
| Example 2 | Synthesis Example 2 | ○ |
| Example 3 | Synthesis Example 3 | ○ |
| Example 4 | Synthesis Example 4 | ○ |
| Example 5 | Synthesis Example 4 | X |
| Comparative Example 1 | Comparative Synthesis Example 1 | ○ |

Example 6

An aerogel precursor solution was prepared by mixing the aerogel precursor of Synthesis Example 4, ethanol and water in a weight ratio of 1:0.5:0.3. At room temperature, the catalyst ($NH_4OH:C_2H_5OH$=volume ratio of 1:12.65) was mixed with the aerogel precursor solution in a weight ratio of 1:0.12, and gelled to prepare a wet gel of pH 5. The wet gel was aged for 1 hour at 60° C. The aged wet gel was acidified in the hydrochloride acid aqueous solution, hexamethyldisiloxane and ethanol were added, and a first separation of the water phase was performed by stirring for 5 hours at room temperature. A second separation of the water phase was performed by stirring for 24 hours at room temperature. After adding ethanol, a third separation of the water phase was performed by stirring for 3 days at room temperature. The gel was dried in a hot nitrogen stream for 1 hour to prepare an aerogel.

Comparative Example 2

An aerogel precursor solution was prepared by mixing a mixture, obtained by mixing TEOS and MTMS in a molar ratio of 1:3, ethanol, and water in a weight ratio of 1:0.5:0.3. At room temperature, the catalyst ($NH_4OH:C_2H_5OH$=volume ratio of 1:12.65) was mixed with the aerogel precursor solution in a weight ratio of 1:0.12, but gelation did not occur within the gelation time of Examples 1 to 6, and thus an aerogel was not produced.

Comparative Example 3

The aerogel precursor prepared by Comparative Synthesis Example 2 was subjected to natural gelation to prepare a wet gel. The wet gel was aged for 24 hours at 60° C. The aged wet gel was subjected to supercritical drying for 8 hours using $CO_2$ at 50° C. and 100 bar, and was dried for 1 hour at 150° C. and atmospheric pressure to prepare an aerogel.

Experimental Example 2: Evaluation of Physical Properties of Aerogel 1

Figure 2:
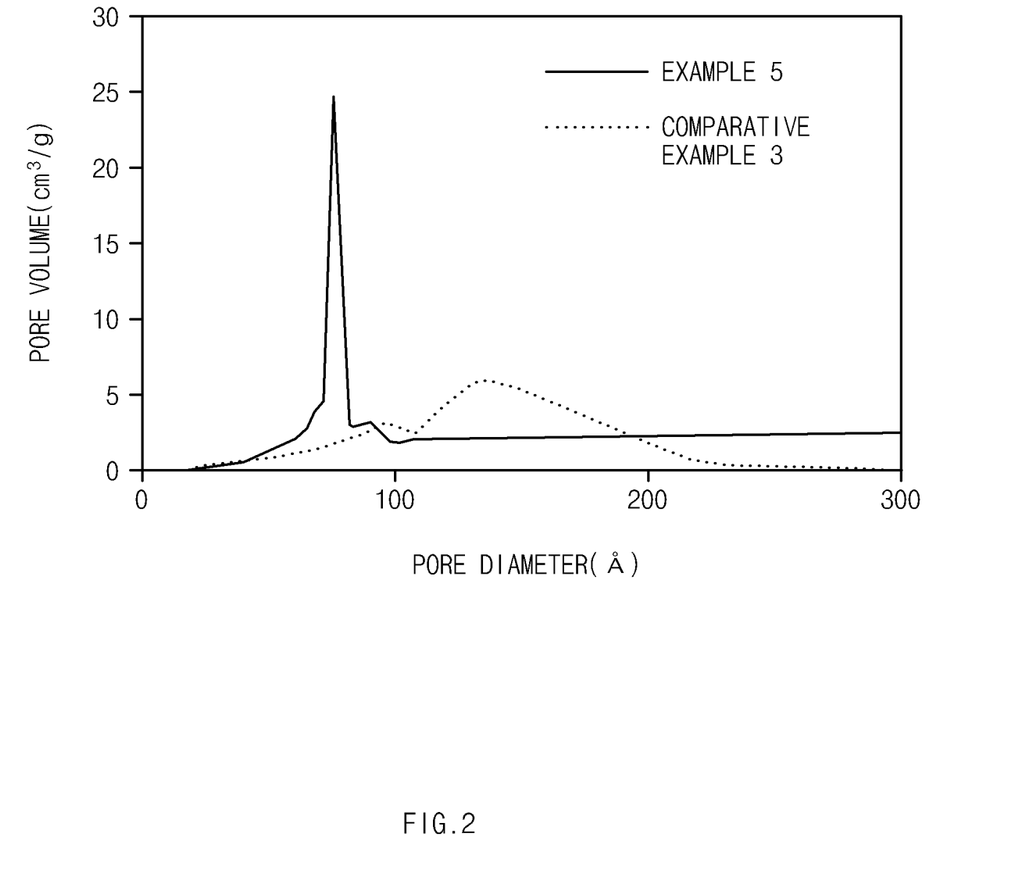
FIG. 2 is a graph showing the distribution of pores inside the aerogels of Example 5 and Comparative Example 3.

The pore distribution in the aerogel of Example 5 and Comparative Example 3 was measured, and the results were shown in FIG. 2. In FIG. 2, the x axis represents pore diameter (unit: Å) and the y axis represents pore volume (unit: $cm^3/g$).

As shown in FIG. 2, it was ascertained that the pores in the aerogel of Example 5 were distributed with a more uniform diameter and volume than the pores in the aerogel of Comparative Example 3.

Experimental Example 3: Evaluation of Physical Properties of Aerogel 2

The aerogels of Examples 1 to 5, Comparative Example and Comparative Examples 3 were evaluated for hydrophobicity at room temperature and high temperatures, and the results were shown in Table 3 below.

1) Hydrophobicity Evaluation Method: The carbon content of the aerogel before and after heating was measured by using a carbon analyzer (manufacturer: Eltra, model: Carbon/Sulfur Analyzer (CS-800)). The heating was carried out for 6 hours at 450° C. after charging the aerogel into a furnace, and carbon content is the measured carbon weight with respect to the total weight of the aerogel.

TABLE 3

| Classification | Carbon content before heating (wt %) | Carbon content after heating (wt %) | Carbon reduction ratio (%) |
|---|---|---|---|
| Example 1 | 10.3 | 2.5 | 75.72 |
| Example 2 | 11.4 | 2.7 | 76.31 |

TABLE 3-continued

| Classification | Carbon content before heating (wt %) | Carbon content after heating (wt %) | Carbon reduction ratio (%) |
|---|---|---|---|
| Example 3 | 12.2 | 3.3 | 72.95 |
| Example 4 | 12.9 | 3.6 | 72.09 |
| Example 5 | 3.9 | 1.1 | 71.79 |
| Comparative Example 1 | 8.0 | 0.5 | 93.75 |
| Comparative Example 3 | 2.5 | 0.6 | 76.00 |

As shown in Table 3, the aerogels of Examples 1 to 4 were confirmed to be excellent in terms of room temperature hydrophobicity due to having a carbon content before heating of 10% by weight or higher. The carbon content of the aerogels of Examples 1 to 4 after heating was 2.5% by weight to 3.6% by weight, and thus it was ascertained that the hydrophobicity at high temperatures was also comparatively excellent. Further, since the carbon reduction rate is 70 to 80% at a high temperature, it may be seen that the high temperature stability is also comparatively excellent.

The aerogel of Example 5 used the same aerogel precursor as the aerogel of Example 4, but differed from the aerogel of Example 4 in that the surface modification process was not performed. The aerogel of Example 5 had a carbon reduction rate of 71.79% after heating, and thus was ascertained to have the best high-temperature stability.

On the other hand, since the aerogel of Comparative Example 1 was not hydrophobized with the aerogel precursor, even when the aerogel was prepared under the same conditions as those of the Examples, the hydrophobicity at room temperature was not good compared to the Examples. In addition, after heating, the carbon content decreased by 93.75% and the carbon content reached 0.5%. From these results, it was ascertained that Comparative Example 1 was not good in terms of high temperature hydrophobicity and was poor in terms of high temperature stability. In the case of Comparative Example 3, as in Example 4, an aerogel was prepared by using the aerogel precursor in which TEOS and MTMS was used in the same molar ratio, but the aerogel precursor prepared by an acid catalytic condensation reaction was used instead of a hydrolysis and polycondensation reaction. The room temperature and high temperature hydrophobicity and high temperature stability of Comparative Example 3 were significantly lower than those of Example 4. From these results, it was ascertained that the difference in preparation method of the aerogel precursor greatly affects the physical properties of the aerogel, that is, the hydrophobicity.

<Preparation of Aerogel Blanket>

Example 7

The aerogel precursor solution was prepared by mixing the aerogel precursor of Synthesis Example 4, ethanol, and water in a weight ratio of 1:0.5:0.3. At room temperature, the catalyst ($NH_4OH:C_2H_5OH$=volume ratio of 1:12.65) was mixed with the aerogel precursor solution in a weight ratio of 1:0.12, and the glass fiber was immersed and gelled to prepare a wet gel-based composite. The wet gel-based complex was aged at 60° C. for 1 hour. The aged wet gel-based composite was surface-modified at 60° C. for 4 hours. The surface-modified wet gel-based composite was subjected to supercritical drying using $CO_2$ at 50° C. and 100 bars for 8 hours, and dried at 150° C. and atmospheric pressure for 1 hour to produce an aerogel blanket.

Example 8

An aerogel blanket was prepared in the same manner as in Example 7, except that surface modification was not performed.

Comparative Example 4

A glass fiber was immersed in the aerogel precursor prepared in Comparative Synthesis Example 2 and then was subjected to natural gelation to prepare a wet gel-based composite. The aged wet gel-based composite was aged at 60° C. for 1 hour. The aged wet gel-based composite was surface-modified at 60° C. for 4 hours. The surface-modified wet gel-based composite was subjected to supercritical drying by using $CO_2$ at 50° C. and 100 bars for 8 hours, and dried at 150° C. and atmospheric pressure for 1 hour to produce an aerogel blanket.

Comparative Example 5

An aerogel blanket was prepared in the same manner as in Comparative Example 4, except that surface modification was not performed.

Experimental Example 4: Evaluation of Physical Properties of Aerogel Blanket

The thermal insulation of the aerogel blankets of Example 7, Example 8, Comparative Example 4 and Comparative Example 5 was evaluated, and the results are shown in Table 4 below.

2) Evaluation of Thermal Insulation: The HFM436 Lambda instrument of NETZSCH Company was used to measure the thermal insulation.

TABLE 4

| Classification | Thermal insulation (thermal conductivity: mW/mK) |
|---|---|
| Example 7 | 18.0 |
| Example 8 | 19.0 |
| Comparative Example 4 | 25.0 |
| Comparative Example 5 | 27.0 |

As shown in Table 4, the aerogel blankets of Examples 7 and 8 have a thermal conductivity of 18 to 19 mW/mK, and thus it was confirmed that the thermal conductivity of the aerogel blanket of Examples 7 and 8 was higher than that of Comparative Examples 4 and 5 by 6-9 mW/mK. It was also confirmed that the surface modification in the preparation of the aerogel blanket has a positive effect on improving the degree of thermal insulation of the aerogel blanket.

On the other hand, in the case of Comparative Example 4 and Comparative Example 5, although, as in Example 7 and Example 8, an aerogel blanket was prepared by using an aerogel precursor in which TEOS and MTMS were used in the same molar ratio, an aerogel precursor prepared by an acid catalyst condensation reaction was used instead of one prepared by hydrolysis and a polycondensation reaction. From these results, it was confirmed that the difference in manufacturing method of the aerogel precursor greatly affects the physical properties of the aerogel blanket, that is, the degree of thermal insulation.

The invention claimed is:

1. An aerogel precursor comprising:
a structural unit of Formula 1 below and at least one selected from the group consisting of structural units of Formulae 2 to 4 below in a molar ratio of 100:1 to 100:20,
wherein the aerogel precursor has a weight average molecular weight of 1,000 to 6,000 g/mol; and
a viscosity of 2.0 to 4.0 cP after heating for 24 hours at 45° C. to 60° C.:

<Formula 1>

<Formula 2>

<Formula 3>

<Formula 4>

<Formula 6-1>

<Formula 6-2>

<Formula 6-3> wherein in Formulae 1 to 4:

$L_1$ to $L_4$ are O;

X is Si, Ti, Zr, Hf or Rf;

$R_1$ is a substituted or unsubstituted $C_1$ to $C_{20}$ linear alkyl group, a substituted or unsubstituted $C_3$ to $C_{20}$ branched or cyclic alkyl group, a substituted or unsubstituted $C_2$ to $C_{20}$ linear alkenyl group, a substituted or unsubstituted $C_4$ to $C_{20}$ branched alkenyl group, a substituted or unsubstituted $C_2$ to $C_{20}$ linear alkynyl group, or a substituted or unsubstituted $C_5$ to $C_{20}$ aryl group; and $R_2$ is a halogen atom, a hydroxyl group, or a substituted or unsubstituted $C_1$ to $C_{20}$ alkoxy group;

wherein the aerogel precursor includes as a structural unit at least one selected from the group consisting of a structural unit of Formulae 6-1 to 6-3:

wherein R is a substituted or unsubstituted $C_1$ to $C_3$ linear alkyl group, a substituted or unsubstituted $C_3$ to $C_{20}$ branched alkyl group, or a substituted or unsubstituted $C_3$ to $C_{20}$ cyclic alkyl group;

wherein the aerogel precursor is prepared by the following steps:

Step 1 of preparing a mixture by mixing a compound of Formula 21 and a compound of Formula 22 below in a molar ratio of 100:1 to 100:20 with alcohol;

Step 2 of hydrolyzing and polycondensing the mixture comprising the following steps:

Step 2-1 of hydrolyzing the mixture using an acid catalyst and water to prepare a reactant; and Step 2-2 of polycondensing the reactant by heat-refluxing at 70 to 100° C. for 1 hour to 30 hours to prepare the aerogel precursor, <Formula 21>

<Formula 22> wherein in Formulae 21 and 22,
R, X, R₁ and R₂ are defined above.

2. The aerogel precursor of claim 1, wherein the aerogel precursor includes a structural unit of Formula 1 and at least one selected from the group consisting of structural units of Formulae 2 to 4 in a molar ratio of 100:4 to 100:10; and has a weight average molecular weight of 1,000 g/mol to 2,000 g/mol.

3. The aerogel precursor of claim 1, wherein the aerogel precursor has a viscosity of 2.5 to 3.5 cP after heating for 24 hours at 45 to 60° C.

4. The aerogel precursor of claim 1, wherein the aerogel precursor is maintained at a viscosity of 2.0 to 4.0 cP at room temperature for 6 months or more.

5. The aerogel precursor of claim 4, wherein the aerogel precursor is maintained at a viscosity of 2.5 to 3.5 cP at room temperature for 6 months or more.

6. The aerogel precursor of claim 1, wherein the structural unit of Formula 1 is derived from a compound of Formula 21 below:

<Formula 21> wherein in Formula 21:
R is a substituted or unsubstituted $C_1$ to $C_{20}$ linear alkyl group, or a substituted or unsubstituted $C_3$ to $C_{20}$ branched or cyclic alkyl group.

7. The aerogel precursor of claim 6, wherein the R is an ethyl group.

8. The aerogel precursor of claim 1, wherein the structural units of Formulae 2 to 4 are derived from a compound of Formula 22 below:

<Formula 22> wherein in Formula 22:
X is Si, Ti, Zr, Hf or Rf;
R₁ is a substituted or unsubstituted $C_1$ to $C_{20}$ linear alkyl group, a substituted or unsubstituted $C_3$ to $C_{20}$ branched or cyclic alkyl group, a substituted or unsubstituted $C_2$ to $C_{20}$ linear alkenyl group, a substituted or unsubstituted $C_4$ to $C_{20}$ branched alkenyl group, a substituted or unsubstituted $C_2$ to $C_{20}$ linear alkynyl group, or a substituted or unsubstituted $C_5$ to $C_{20}$ aryl group; and
R₂ is a halogen atom, a hydroxyl group, or a substituted or unsubstituted $C_1$ to $C_{20}$ alkoxy group.

9. The aerogel precursor of claim 8, wherein the X is Si, the R₁ is a methyl group, and the R₂ is methoxy.

10. A method for preparing an aerogel precursor according to claim 1, comprising:
Step 1 of preparing a mixture by mixing a compound of Formula 21 below and a compound of Formula 22 below in a molar ratio of 100:1 to 100:20 with alcohol; and
Step 2 of hydrolyzing and polycondensing the mixture comprising the following steps:
Step 2-1 of hydrolyzing the mixture using an acid catalyst and water to prepare a reactant; and
Step 2-2 of polycondensing the mixture by heat-refluxing at 70 to 100° C. for 1 hour to 30 hours to prepare the aerogel precursor:

<Formula 21>

<Formula 22> wherein in Formulae 21 and 22:
R is a substituted or unsubstituted $C_1$ to $C_{20}$ linear alkyl group, or a substituted or unsubstituted $C_3$ to $C_{20}$ branched or cyclic alkyl group;
X is Si, Ti, Zr, Hf or Rf;
R₁ is a substituted or unsubstituted $C_1$ to $C_{20}$ linear alkyl group, a substituted or unsubstituted $C_3$ to $C_{20}$ branched or cyclic alkyl group, a substituted or unsubstituted $C_2$ to $C_{20}$ linear alkenyl group, a substituted or unsubstituted $C_4$ to $C_{20}$ branched alkenyl group, a substituted or unsubstituted $C_2$ to $C_{20}$ linear alkynyl group, or a substituted or unsubstituted $C_5$ to $C_{20}$ aryl group; and
R₂ is a halogen atom, a hydroxyl group, or a substituted or unsubstituted $C_1$ or $C_{20}$ alkoxy group.

11. The method of claim 10, wherein the acid catalyst is at least one selected from the group consisting of hydrochloric acid, nitric acid, acetic acid, citric acid, and oxalic acid.

12. A method for preparing an aerogel, comprising:
mixing the aerogel precursor according to claim 1 with a basic catalyst to form a wet gel at pH≥3;
mixing the wet gel with a hydrophobic agent to modify a surface; and
drying the surface-modified gel.

13. The method of claim 12, wherein the surface-modified gel is a surface-silylated wet gel.

14. The method of claim 12, wherein the hydrophobic agent is at least one selected from the group consisting of $(R_3)_{4-n}SiCl_n$, $(R_4)_{4-m}Si(OR_5)_m$, $(R_6)_3Si-O-Si(R_6)_3$, and $(R_7)_3Si-O-Si(R_7)_3$, $R_3$ to $R_7$ are the same as or different from each other and are each independently a hydrogen atom, a substituted or unsubstituted $C_1$ to $C_{20}$ linear alkyl group, a substituted or unsubstituted $C_3$ to $C_{20}$ branched or cyclic alkyl group, or a substituted or unsubstituted $C_5$ to $C_{20}$ aryl group, and n and m are the same as or different from each other and are each independently 1 to 4.

15. The method of claim 14, wherein the hydrophobic agent is at least one selected from the group consisting of silazane, hexamethyldisilazane, trimethylchlorosilane, hexamethyldisiloxane, trimethylsiloxane, and isopropoxytrimethylsilane.

16. The method of claim 12, wherein some water present in the wet gel reacts with the hydrophobic agent.

\* \* \* \* \*